United States Patent
Nishimura et al.

(10) Patent No.: US 8,403,499 B2
(45) Date of Patent: Mar. 26, 2013

(54) LIGHT SOURCE LAMP COOLING APPARATUS AND PROJECTION DISPLAY APPARATUS INCLUDING DETECTING GAS PRESSURE TO CONTROL LIGHT SOURCE

(75) Inventors: Yoshifumi Nishimura, Tokyo (JP); Hiroaki Takamatsu, Tokyo (JP); Takayuki Okada, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 358 days.

(21) Appl. No.: 12/310,993

(22) PCT Filed: Sep. 13, 2007

(86) PCT No.: PCT/JP2007/068327
§ 371 (c)(1), (2), (4) Date: Apr. 8, 2009

(87) PCT Pub. No.: WO2008/047528
PCT Pub. Date: Apr. 24, 2008

(65) Prior Publication Data
US 2009/0290130 A1    Nov. 26, 2009

(30) Foreign Application Priority Data
Oct. 3, 2006 (JP) .................................. 2006-271869

(51) Int. Cl.
*G03B 21/16* (2006.01)
*F21V 29/00* (2006.01)

(52) U.S. Cl. .............................. 353/61; 353/60; 362/373

(58) Field of Classification Search .................. 250/239, 250/231.1, 205; 353/52–61; 362/345, 373, 362/294, 547, 218; 348/748, 749; 352/146, 352/202; 454/238, 244, 251, 255, 258, 305, 454/329, 340, 341; 165/201, 212, 218, 246, 165/253, 287, 60, 122, 123, 177, 178; 313/46; 315/118

See application file for complete search history.

(56) References Cited

U.S. PATENT DOCUMENTS
(Continued)

FOREIGN PATENT DOCUMENTS
CN   1428511 A   7/2003
CN   1567085 A   1/2005
(Continued)

OTHER PUBLICATIONS

Chinese Office Action dated Nov. 13, 2009 with English-language translation.

(Continued)

*Primary Examiner* — Que T Le
*Assistant Examiner* — Jennifer Bennett
(74) *Attorney, Agent, or Firm* — McGinn IP Law Group, PLLC (57) ABSTRACT

A light source lamp cooling apparatus according to the present invention includes: diaphragm air compressor (31); an ejector which ejects cooling air directly onto a portion to be cooled of a light source lamp in lamp unit (10); pressure detector (43) which detects pressure of the cooling air by means of pressure sensor (42) inserted in piping; air piping which connects air compressor (31) and the ejector; and a lamp controller which controls turning off of the light source lamp according to the air pressure detected by pressure detector (43). Air compressor (31) is driven at a high control frequency and a hollow, flexible silicon tube is used as air piping to reduce pulsation of air.

20 Claims, 7 Drawing Sheets

U.S. PATENT DOCUMENTS

| | | | |
|---|---|---|---|
| 2,935,825 A * | 5/1960 | Moore et al. ............... | 53/403 |
| 3,021,835 A * | 2/1962 | Rose ........................ | 600/178 |
| 4,537,038 A * | 8/1985 | Alsenz et al. .............. | 62/118 |
| 6,381,001 B1 * | 4/2002 | Katakura et al. ........... | 355/30 |
| 6,494,581 B2 * | 12/2002 | Shimizu .................... | 353/61 |
| 6,843,643 B2 | 1/2005 | Fukami et al. | |
| 6,966,654 B2 | 11/2005 | Ozawa et al. | |
| 7,439,660 B2 * | 10/2008 | Pollmann-Retsch et al. ... | 313/35 |
| 2006/0227555 A1 * | 10/2006 | Nishimura et al. ........... | 362/294 |

FOREIGN PATENT DOCUMENTS

| | | |
|---|---|---|
| CN | 1251018 C | 4/2006 |
| EP | 1 640 797 A1 | 3/2006 |
| JP | 04-206207 | 7/1992 |
| JP | 4-206207 A | 7/1992 |
| JP | 9-268982 | 10/1997 |
| JP | 11-270773 | 10/1999 |
| JP | 2000-297913 | 10/2000 |
| JP | 2000-352762 | 12/2000 |
| JP | 2001-256819 A | 9/2001 |
| JP | 2003-075849 | 3/2003 |
| JP | 2003-115281 A | 4/2003 |
| JP | 2003-328951 | 11/2003 |
| JP | 2004-194770 | 7/2004 |
| JP | 2005-148624 | 6/2005 |
| JP | 2005-148624 A | 6/2005 |
| JP | 2005-149841 | 6/2005 |
| JP | 2005-181412 A | 7/2005 |
| JP | 2005-316347 A | 11/2005 |
| JP | 2006-53288 A | 2/2006 |
| JP | 2006-091132 | 4/2006 |
| JP | 2006-243635 A | 9/2006 |
| WO | 02/097529 A1 | 12/2002 |
| WO | WO2004/102068 A1 | 11/2004 |
| WO | WO 2004102068 A1 * | 11/2004 |

OTHER PUBLICATIONS

Japanese Office Action dated Feb. 29, 2012 (with a partial English translation).

Japanese Office Action dated Nov. 9, 2010, with partial English translation.

* cited by examiner

LIGHT SOURCE LAMP COOLING APPARATUS AND PROJECTION DISPLAY APPARATUS INCLUDING DETECTING GAS PRESSURE TO CONTROL LIGHT SOURCE

TECHNICAL FIELD

The present invention relates to a light source lamp cooling apparatus and projection display apparatus. More particularly, the present invention relates to a light source lamp cooling apparatus and projection display apparatus which detect pneumatic pressure from a cooling fan and turn off a light source lamp when the detected pneumatic pressure exceeds a predetermined limit.

RELATED ART

A projection display apparatus has especially large heating elements and needs to be cooled in order to ensure performance and reliability. Methods for cooling the projection display apparatus are broadly classified into two types: air cooling and liquid cooling which includes water cooling. Cooling methods for electronic equipment are further classified into natural air cooling and forced air cooling. In forced air cooling, air is directed forcibly at an object to be cooled or heated air is discharged from the equipment using any of various fans.

The cooling fan produces sound and an attempt to increase the cooling capacity of electronic equipment can turn the sound produced by the cooling fan into noise, thereby posing a problem. This trend is noticeable in electronic equipment which has large heating elements and tends to become more pronounced along with downsizing of the equipment.

In particular, light source lamps, which need to be kept within a predetermined optimal temperature range, are generally cooled by air because they are difficult to be cooled by liquid due to their structure. High-power lamps require a cooling wind with a very high flow velocity in order to increase cooling efficiency. Consequently, multiblade fans exemplified by sirocco fans are often used to cool light source lamps in related art.

The flow of air is throttled by an air duct to obtain high flow velocity, but this involves high pressure loss and the sound produced by the fan can develop into noise, thereby posing a problem. Besides, with small equipment, sufficient space is not available around a fan in many cases, and thus it is difficult to use the fan with high efficiency.

Consequently, there is demand for a high static pressure, low-noise cooling device which can compensate for high pressure loss. Among various air compressors, displacement reciprocating compressors provide very high static pressure. Diaphragm air compressors provide air pressure a hundred or more times higher than typical sirocco fans in spite of their small size and their use as a means of cooling light source lamps are being studied.

However, air with high static pressure produced by a displacement reciprocating compressor pulsates, and it is necessary to reduce the pulsation in order to cool steadily an object. Also, air is passed through small diameter piping at high velocity, which may cause clogging with dust or air leakage at the connections of flow paths.

Japanese Patent Laid-Open No. 2006-91132 discloses a projector apparatus which causes a cooling wind that is introduced through a duct to flow in to a light source lamp through a cooling-air inlet provided in a duct wall. However, since it assumes the use of a Sirocco fan, it does not raise the problem of clogging with dust in the cooling wind or air leakage at the connections of flow paths.

Japanese Patent Laid-Open No. 2003-328951 discloses a diaphragm pump which is a displacement reciprocating compressor.

Regarding the problem of pulsation, Japanese Patent Laid-Open No. 11-270773 discloses a method for introducing air into piping upstream of a pump by detecting pressure in a pressure chamber as an approach to prevention of damage to the pressure chamber in relation to a pulsation prevention structure for the pump.

Japanese Patent Laid-Open No. 9-268982 discloses a method for suppressing variations in discharge pressure of a pump by controlling the rotation of a pump motor only in relation to pressure variations attributable to the pump by applying an electrical filter to measurement values of a pressure gauge installed in a flow path downstream of a pump's discharge port.

DISCLOSURE OF THE INVENTION

Diaphragm pumps which are displacement reciprocating compressors provide high static pressure in spite of their very small size. They provide pressure a few hundred times higher than typical sirocco fans.

However, since small displacement reciprocating compressors provide low flow rates, it is necessary to increase air speed by delivering high-pressure air through a flow path having a small cross-sectional area. Thus, with small displacement reciprocating compressors, it is accepted practice to increase air speed using a minute hole as a cooling wind ejection hole. The use of a minute hole as a cooling wind ejection hole is problematic in that even minute dust can clog the ejection hole as described above. Also, cooling devices with high static pressure, which involve high pneumatic pressure, may pose a problem of air leakage at the juncture where flow paths, which are used to deliver a cooling wind, connect.

In dealing with the problem of pulsation, it is difficult to apply the method described in Japanese Patent Laid-Open No. 11-270773 or 9-268982 to a projection display apparatus whose requirements call for a compact size.

An object of the present invention is to provide a light source lamp cooling apparatus and a projection display apparatus which can reduce the effects of pressure variations on lamp temperatures, prevent the effects of clogging and leakage in gas flow paths, and ensure high reliability of lamp's illumination operation, using a simple configuration.

A light source lamp cooling apparatus according to the present invention comprises: a gas compressor which compresses gas; an ejector which ejects the gas compressed by the gas compressor directly onto a portion of a light source lamp to be cooled; gas piping which connects the gas compressor and the ejector; a pressure detector which detects gas pressure in the gas piping; and a lamp controller which controls the light source lamp according to the gas pressure in the gas piping detected by the pressure detector.

The lamp controller may turn off the light source lamp when the gas pressure detected by the pressure detector reaches or exceeds a predetermined pressure. Also, the lamp controller may turn off the light source lamp when the gas pressure detected by the pressure detector reaches or falls below a predetermined pressure.

The gas compressor may be a reciprocating air compressor. Also, the reciprocating air compressor may be a diaphragm air compressor. The control frequency of the gas compressor may be a frequency in a high frequency band. The control frequency of the gas compressor may be a frequency in a frequency band of 20 kHz±5 kHz. Preferably, the gas piping is hollow and flexible.

The ejector may be installed on a holding member which holds a translucent member installed in an emission-side opening of a lamp unit equipped with the light source lamp and couples the translucent member with a reflector; and ejection holes of the ejector may be directed at one or more predetermined sites on the light source lamp. The shape, area, and number of the ejection holes may be set according to the cooling requirements of the predetermined sites onto which gas is ejected from the ejection holes. The total cross-sectional opening area of the ejection holes of the ejector may be smaller than the cross-sectional area of the gas piping and the cross-sectional area of the cooling wind supply port in the reflector holding member. An opening may be provided in the reflector holding member to discharge a cooling wind from the lamp unit. The gas may be air.

The projection display apparatus according to the present invention comprises the light source lamp cooling apparatus described above.

The light source lamp cooling apparatus according to the present invention includes the pressure detector which detects gas pressure in the gas piping and the lamp controller which controls the light source lamp according to the gas pressure in the gas piping detected by the pressure detector. The light source lamp cooling apparatus according to the present invention turns off the light source lamp when the gas pressure in the gas piping reaches or exceeds a predetermined pressure or when it reaches or falls below the predetermined pressure. Consequently, the light source lamp cooling apparatus according to the present invention can turn off the light source lamp in case of clogging or leakage in a gas flow path, and thereby prevent abnormal temperature rises and resulting failures of the light source lamp caused by a blast failure. The resulting failures include reduction in lamp life and breakage of the lamp as well as reduction in brightness caused by displacement of the optical axis of the light source lamp due to thermal deformation of the structure around the lamp.

Since the light source lamp cooling apparatus according to the present invention uses a reciprocating gas compressor, it can eject high-pressure gas as a high-speed cooling wind from the ejector directly onto a portion to be cooled, enabling efficient cooling.

In the light source lamp cooling apparatus according to the present invention, since the control frequency of the air compressor is set, for example, at as high as 20 kHz±5 kHz, it is possible to relatively reduce the effects of pressure variations on lamp temperatures. That is, the operating frequencies of diaphragms according to the related art are 60 Hz or below, which makes pulsation and unpleasant noise stand out, posing a problem. In contrast, in the light source lamp cooling apparatus according to the present invention, the control frequency of the air compressor is set higher, thereby setting the operating frequency of the diaphragm at as high as 125 Hz. Also, in the light source lamp cooling apparatus according to the present invention, since the gas piping, which connects the gas compressor and ejector, is hollow and flexible, pulsation of air flow is also reduced by deformation of the piping in conformity with pressure. Furthermore, even if there is limited installation space in a housing, the hollow, flexible piping allows for a high degree of design freedom, in layout, forms a smooth flow path with low pressure loss, and prevents air leakage at connection points with the air compressor or ejector. These effects are especially prominent when the air compressor and ejector are located at some distance from each other.

Since the total cross-sectional opening area of the ejection holes of the ejector is smaller than the cross-sectional area of the gas piping and the cross-sectional area of the cooling wind supply port in the reflector holding member, the cooling wind is ejected from the ejector at high speed.

Thus, the present invention can implement a light source lamp cooling apparatus which can ensure high reliability of the lamp's illumination operation using a simpler configuration.

The present invention detects the gas pressure in the gas piping, controls the light source lamp according to the gas pressure, and turns off the light source lamp when the gas pressure reaches or exceeds a predetermined pressure or when if reaches or falls below the predetermined pressure. Consequently, the present invention can turn off the light source lamp in case of clogging or leakage in a gas flow path, and thereby prevent failures resulting from abnormal temperature rises. That is, the light source lamp cooling apparatus according to the present invention can prevent reduction in lamp life and breakage of the lamp as well as reduction in brightness caused by displacement of the optical axis of the light source lamp due to thermal deformation of a structure around the lamp.

Since the present invention uses a reciprocating gas compressor which provides high static pressure and is small in size, it can downsize the light source lamp cooling apparatus. This in turn makes it possible to downsize a projection display apparatus and the like which use an air cooling system to cool their light source lamps.

The present invention uses a frequency, for example, as high as 20 kHz±5 kHz as the control frequency of the air compressor. This decreases the range of pressure variations in discharged air and thereby reduces the effects of pressure variations on lamp temperatures. Furthermore, the present invention uses hollow, flexible piping as the gas piping which connects the gas compressor and ejector. Consequently, pulsation of air flow is also reduced by deformation of the piping. As a result of the reduced pulsation, the present invention improves sound quality of the entire cooling system and thereby reduces noise.

BEST MODE FOR CARRYING OUT THE INVENTION

Figure 1:
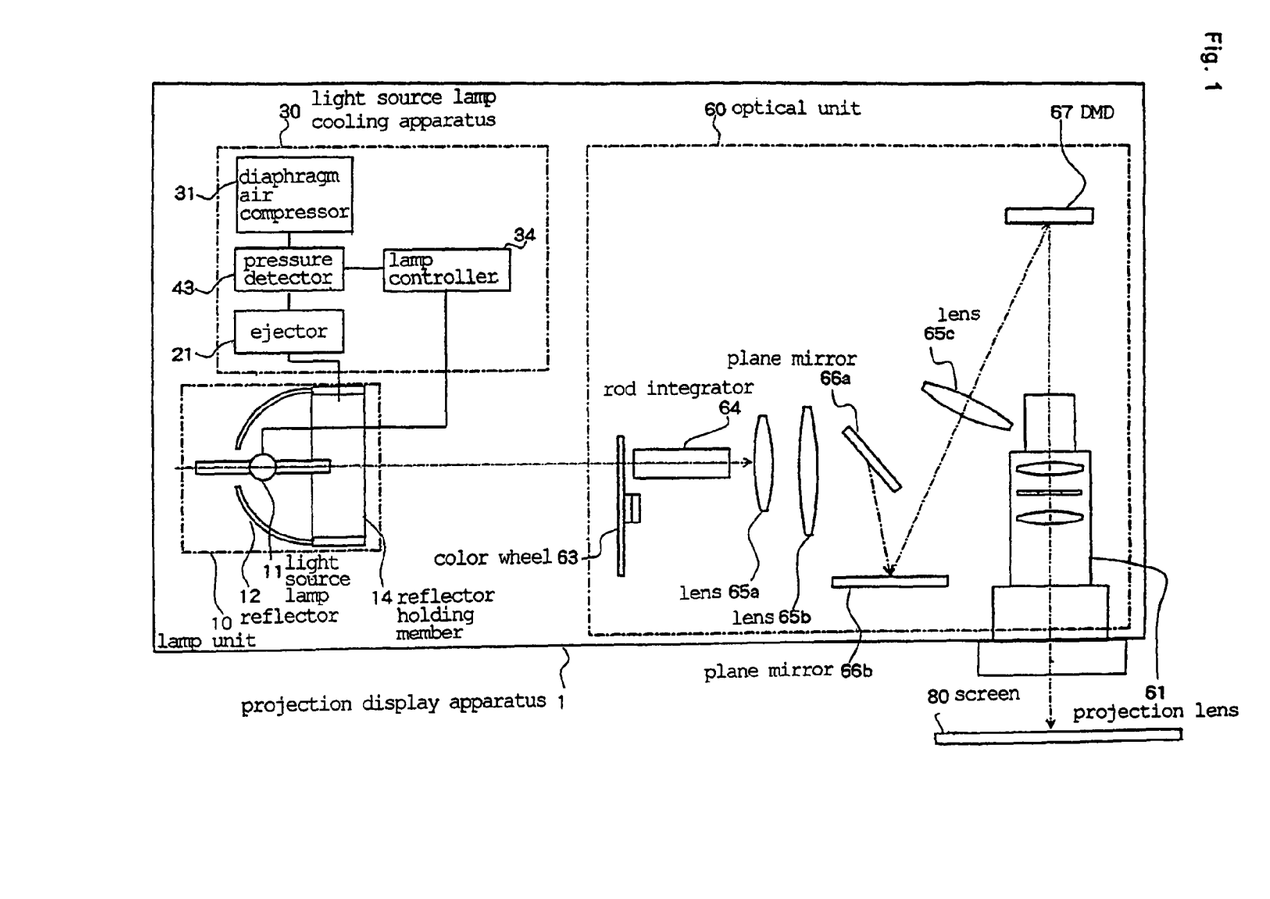
FIG. 1 is a schematic block diagram of a lamp unit, optical unit, and light source lamp cooling apparatus of a projection display apparatus according to an exemplary embodiment.
Figure 2:
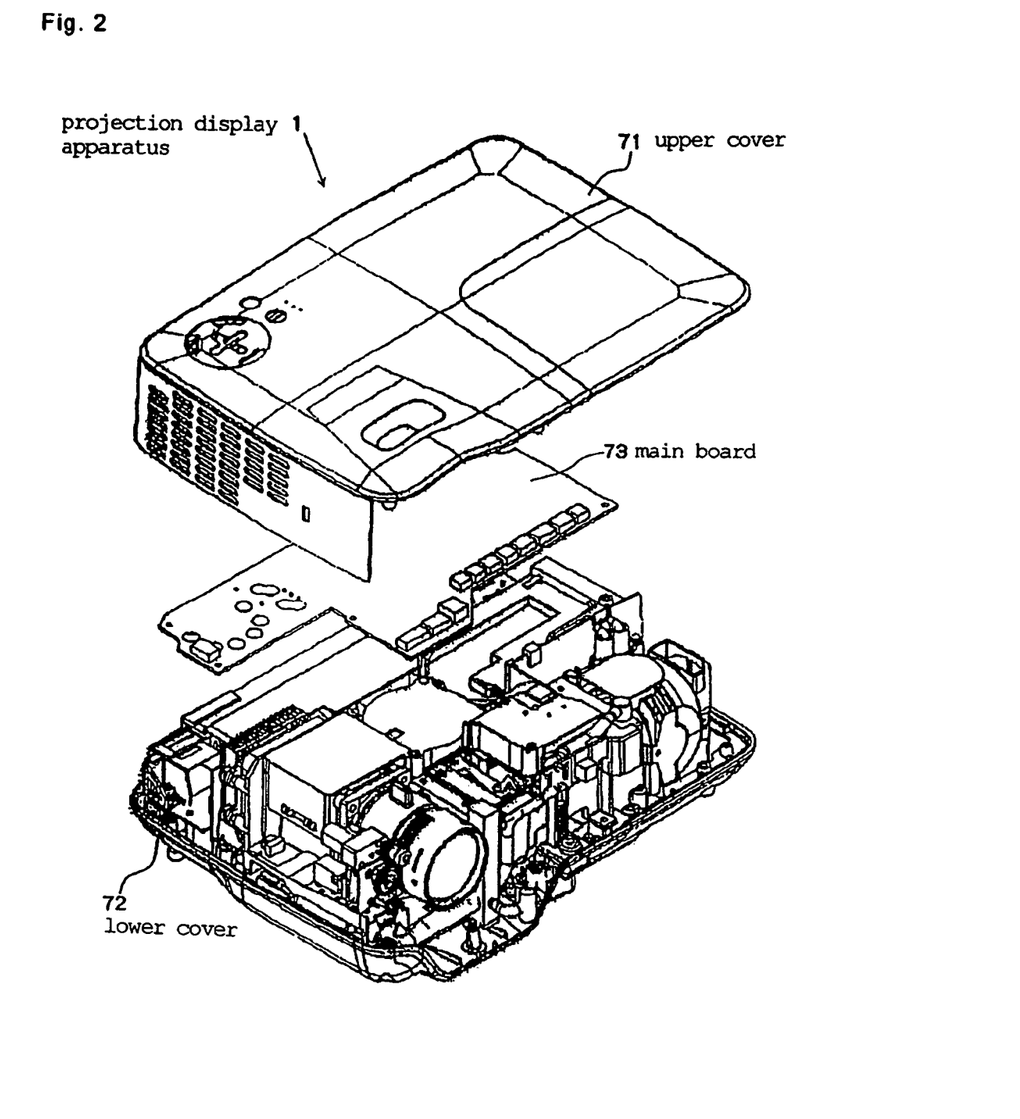
FIG. 2 is a schematic exploded perspective view of the projection display apparatus according to the exemplary embodiment.
Figure 3:
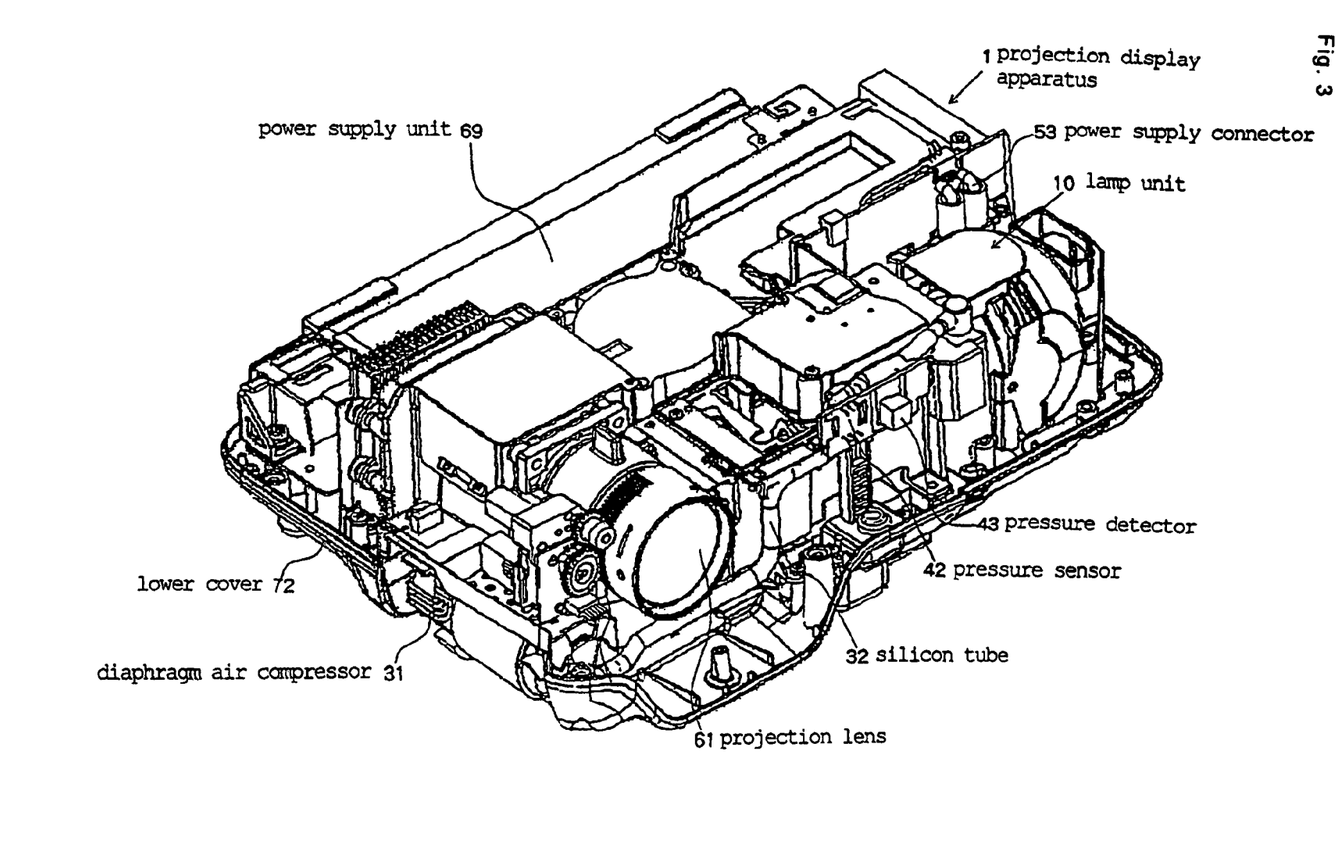
FIG. 3 is a perspective view showing the projection display apparatus according to the exemplary embodiment with a top cover removed from a housing.
Figure 4:
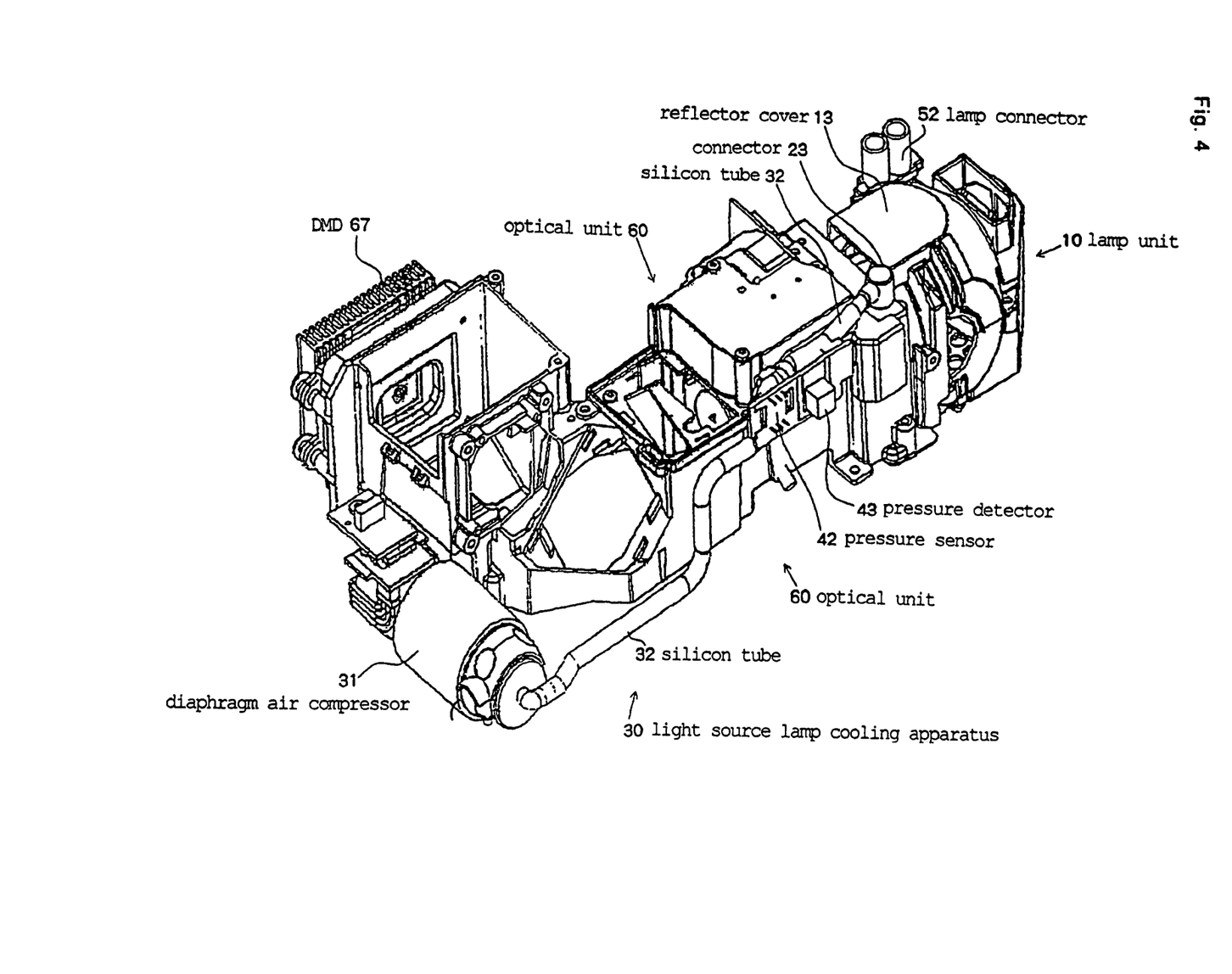
FIG. 4 is a perspective view of the optical unit and lamp unit in FIG. 3, with a projection lens omitted.
Figure 5:
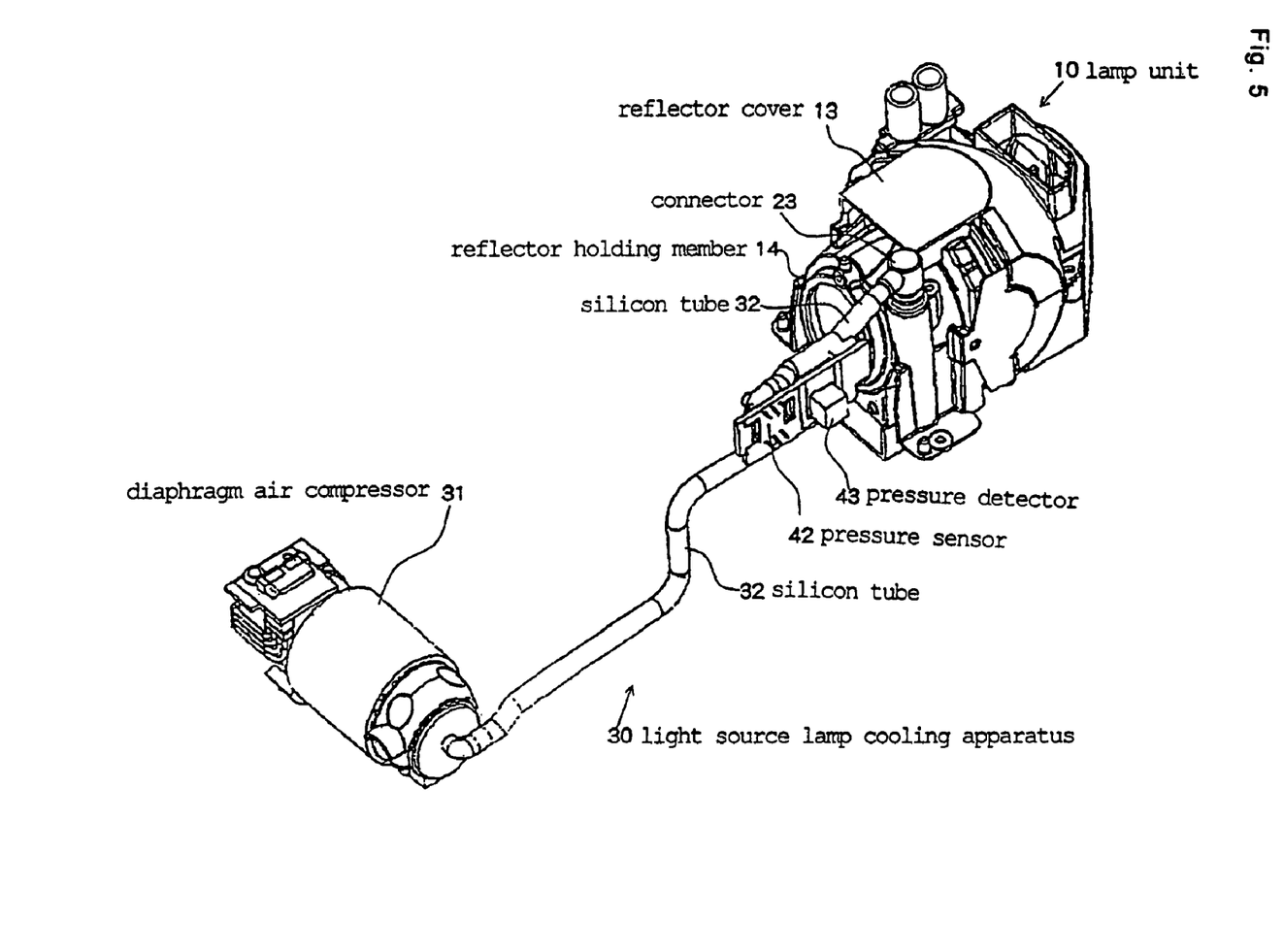
FIG. 5 is a perspective view of the light source lamp cooling apparatus and lamp unit.
Figure 6:
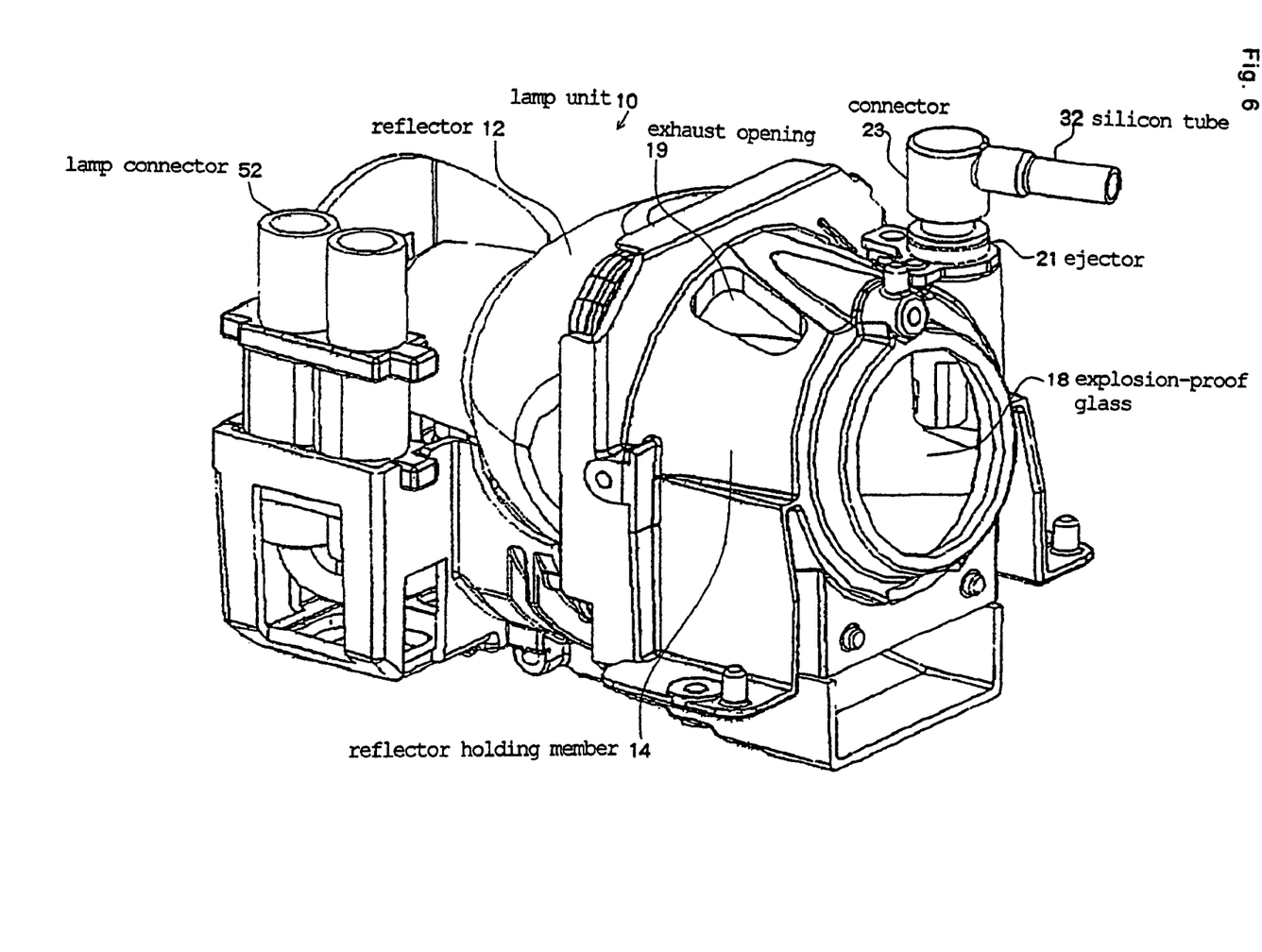
FIG. 6 is a perspective view of the lamp unit.
Figure 7:
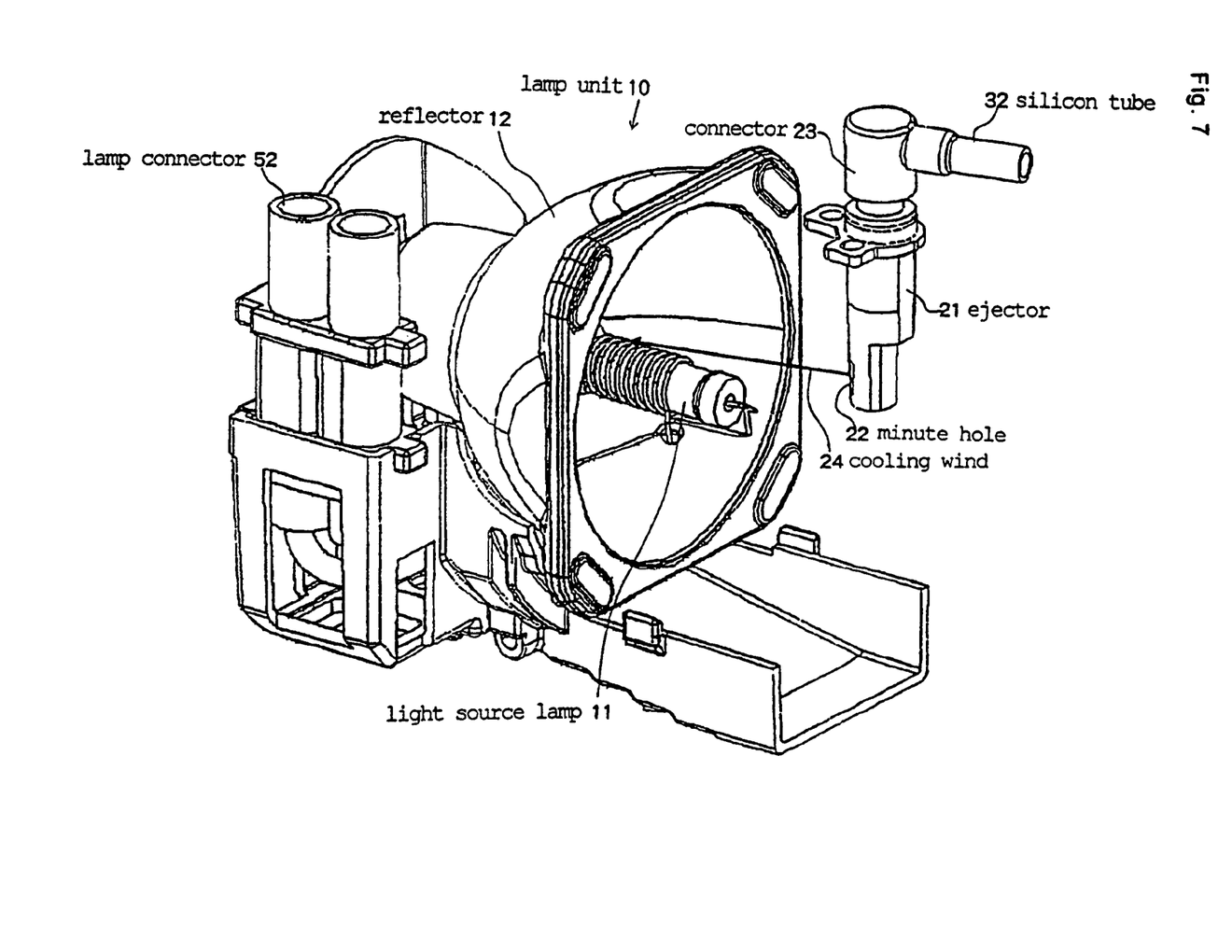
FIG. 7 is an exploded perspective view of the lamp unit excluding a reflector holding member.

Next, an exemplary embodiment will be described with reference to the drawings. FIG. 1 is a schematic block diagram of a lamp unit, optical unit, and light source lamp cooling apparatus of a projection display apparatus according to the exemplary embodiment. FIG. 2 is a schematic exploded perspective view of the projection display apparatus according to the exemplary embodiment. FIG. 3 is a perspective view showing the projection display apparatus according to the exemplary embodiment with a top cover removed from a housing. FIG. 4 is a perspective view of the optical unit and lamp unit in FIG. 3, with a projection lens omitted. FIG. 5 is a perspective view of the light source lamp cooling apparatus and lamp unit. FIG. 6 is a perspective view of the lamp unit. FIG. 7 is an exploded perspective view of the lamp unit excluding a reflector holding member.

In the exemplary embodiment, a light source lamp of a projection display apparatus which has a requirement that it will have high cooling characteristics and be compact, is cited as an example of an object to be cooled, but this is not restrictive and the present invention is broadly applicable to objects which can be cooled by gas ejection. Gas, which is generally available, is cited as air, but helium, argon, or the like with high thermal conductivity can be used as well. Also, a diaphragm air compressor, which features small size, high pressure, and low noise is cited as an air compressor, but this is not restrictive. A reciprocating piston compressor may also be used and rotary or other air compressors are also available for use as long as they provide the necessary pressure and discharge quantity. According to the exemplary embodiment, a gas ejection cooling system is cited as a light source lamp cooling apparatus.

Light source lamp cooling apparatus 30 according to the present invention efficiently cools lamp unit 10 which includes light source lamp 11 and reflector 12 using a small volume of air.

As shown in FIG. 1, projection display apparatus 1 according to the present invention includes lamp unit 10, light source lamp cooling apparatus 30 which is also an exemplary embodiment, and optical unit 60.

Lamp unit 10 includes light source lamp 11, reflector 12, reflector holding member 14, reflector cover 13, and lamp connector 52. Reflector 12 reflects emergent light from light source lamp 11 so that it will converge at a focal point. Reflector holding member 14 holds reflector 12 and positions it in relation to adjoining optical unit 60. It includes explosion-proof glass 18 in a circular opening. Reflector cover 13 protects reflector 12 from the outside. Lamp connector 52 supplies power to light source lamp 11.

As shown in FIGS. 6 and 7, reflector holding member 14 creates a stable flow of cooling wind 24 by providing a space isolated from the inner side (on the side of a reflecting surface) of reflector 12. Also, reflector holding member 14 prevents fragments from being scattered in case the lamp is broken.

Reflector holding member 14 is equipped with ejector 21 and exhaust opening 19. Ejector 21 includes minute hole 22 which ejects cooling wind 24. Cooling wind 24 ejected from minute hole 22 cools light source lamp 11 and is then discharged from exhaust opening 19.

According to the exemplary embodiment, minute hole 22 provided in ejector 21 has a 0.3 mm diameter, which is small in comparison to the 1.5-mm wall thickness of ejector 21. Thus, it gives high directivity to ejected cooling wind 23.

Optical unit 60 includes DMD (digital micromirror device) 67 which is a reflection optical modulator, an illumination optical system which illuminates DMD 67, and projection lens 61 which projects luminous flux from DMD 67 onto screen 80.

The illumination optical system includes, color wheel 63, rod integrator 64, and afocal optical system 65. Color wheel 63 divides light from lamp unit 10 into multiple colors on a time-shared basis. Color wheel 63 is disposed in such a way that a color segment will be located at a focus point of the luminous flux produced by light source lamp 11 and reflected by reflector 12. Rod integrator 64 is a luminance smoothing element which equalizes luminance distribution of luminous flux from lamp unit 10 and emits the equalized luminous flux from an exit plane. Rod integrator 64 is disposed in such a way that its incident end face will be located in a position to receive luminous flux passing through color wheel 63. The afocal optical system leads the luminous flux emitted from rod integrator 64 to DMD 67. The afocal optical system includes lenses 65a, 65b, and 65c and plane mirrors 66a and 66b.

Although a DMD is cited here as an image display apparatus, light source lamp cooling apparatus 30 according to the present invention can also be used for a liquid crystal display apparatus.

As shown in FIGS. 3 to 7, light source lamp cooling apparatus 30, according to an exemplary embodiment of the present invention, includes diaphragm air compressor 31, pressure sensor 42, pressure detector 43, ejector 21, connector 23, and air piping. Diaphragm air compressor 31 that is small in size can produce high-pressure air. Pressure sensor 42 and pressure detector 43 detect air pressure in the piping. Ejector 21 is connected to reflector holding member 14 of lamp unit 10 and equipped with minute hole 22 which ejects cooling wind 24 into reflector holding member 14. Connector 23 is used to connect ejector 21 with silicon tube 32 which constitutes air piping. Silicon tube 32 connects connector 23 and diaphragm air compressor 31.

Reciprocating compressors that are small in size are suited to produce high-pressure air. They are classified into a piston type and diaphragm type. Although it is assumed here that a diaphragm air compressor is used because of its small size, a piston compressor can also be used in the present invention. Diaphragm compressors include those with a single diaphragm and those with multiple diaphragms. The greater the number of diaphragms, the smaller the compressor and the less noise the compressor produces. According to the exemplary embodiment, the compressor has three diaphragms and their driving frequency is set as high as 125 Hz by increasing the rotation speed of the motor which drives the diaphragms.

Furthermore, according to the exemplary embodiment, since diaphragm air compressor 31 is driven at a high control frequency, wavelength and amplitude are decreased, reducing pulsation of discharged air.

Pressure sensor 42 is inserted in silicon tube 32 and pressure detector 43 monitors pneumatic pressure in silicon tube 32 via pressure sensor 42.

If pressure detector 43 detects a pressure higher than a predetermined pressure, main board 73 (FIG. 2) determines that something is wrong with diaphragm air compressor 31 or that a flow path is clogged with dust or the like, and illumination of light source lamp 11 is stopped.

More specifically, pressure detector 43 converts the pressure detected by pressure sensor 42 into an electrical signal and transmits the electrical signal to main board 73 on which lamp controller 34 is located. Then, lamp controller 34 of a CPU on main board 73 determines pressure abnormality, and stops power supply to light source lamp 11 by controlling power supply unit 69 (FIG. 3).

Also, if a pressure lower than a predetermined pressure is detected, it is determined on main board 73 that something is wrong with diaphragm air compressor 31 or that there is an air leak from the flow path, and the illumination of light source lamp 11 is similarly stopped.

Also, even if the air pressure is not high enough to stop the power supply to light source lamp 11, long periods of continued operation at pressures that are nearly high enough to stop the power supply to light source lamp 11 will not only increase noise from diaphragm air compressor 31, but also affect the life of diaphragm air compressor 31. Thus, it is preferable to establish a reference air pressure which will allow long periods of operation and establish pressures at which the power supply to light source lamp 11 will be stopped and which will fall within predetermined tolerances of the reference air pressure.

In the exemplary embodiment, a pressure slightly higher than the pressure corresponding to the reference control frequency of 20 kHz±5 kHz (i.e., the pressure corresponding to the diaphragm's reference operating frequency of 125 Hz) is designated as a set pressure at which to stop illumination.

Alternatively, the control frequency of diaphragm air compressor 31 may be controlled in such a way that the pneumatic pressure measured by pressure detector 43 will coincide with a constant pressure that corresponds to a predetermined reference control frequency. This stabilizes air pressure supplied to ejector 21. On the other hand, in mountainous areas and other highlands located high above sea level, multiblade fans exemplified by sirocco fans used in the related art produce high noise because of increased rotation speed due to low atmospheric pressure and thin air. Also, there are changes in wind noise, and consequently a frequency spectrum (tone quality) of noise changes as well, which may cause more discomfort or may cause the noise to feel louder. In contrast, since this cooling system can keep air pressure in the piping constant, the ejection sound from the ejection hole remains almost unchanged and thus causes no increase in noise. Furthermore, since the pressure in the piping remains constant, conditions of air ejection from the ejection hole remains unchanged. Consequently, the frequency spectrum (tone quality) of the noise remains unchanged, and thus there is no discomfort.

Silicon tube 32 which is flexible is used as the piping which connects diaphragm air compressor 31 with connector 23 that that connects to ejector 21 which is a cooling air supply port. Since silicon tube 32 has no joint in the portion between its ends, even if diaphragm air compressor 31 and light source lamp 11 are located at some distance from each other, there is no fear of cooling wind leakage. Since silicon tube 32 is flexible, there is a high degree of freedom in setting it in the projector and there is minimal pressure loss when the tube is set in the projector.

Also, the flexibility of silicon tube 32 used as the piping, in conjunction with driving diaphragm air compressor 31 at high control frequency, makes it possible to reduce pulsation of discharged air and to eject cooling wind 24 at a target site under an averaged pressure.

Incidentally, according to the exemplary embodiment, the top of light source lamp 11 is cooled using a single minute hole provided in ejector 21, but a plurality of minute holes 22 may be provided in ejector 21 to cool a plurality of target sites. The shape, area, and number of minute holes 22 may be set according to a cooling condition of the object to be cooled. Preferably, the total cross-sectional opening area of minute holes 22 is smaller than the cross-sectional area of silicon tube 32 and the cross-sectional area of connector 23 which is a cooling air supply port.

The invention claimed is:

1. A light source lamp cooling apparatus for cooling a light source lamp, said light source lamp cooling apparatus comprising:

a gas compressor which compresses a gas;
an ejector which ejects said gas compressed by said gas compressor directly onto a portion to be cooled of said light source lamp;
a gas piping which connects said gas compressor and said ejector;
a pressure detector which detects a gas pressure in said gas piping; and
a lamp controller which controls said light source lamp according to said gas pressure in said gas piping detected by said pressure detector,
wherein said ejector comprises a hole which ejects said gas compressed, a diameter of said hole being less than a wall thickness of said ejector.

2. The light source lamp cooling apparatus according to claim 1, wherein said lamp controller turns off said light source lamp when said gas pressure detected by said pressure detector reaches or exceeds a predetermined pressure.

3. The light source lamp cooling apparatus according to claim 1, wherein said lamp controller turns off said light source lamp when said gas pressure detected by said pressure detector reaches or falls below a predetermined pressure.

4. The light source lamp cooling apparatus according to claim 1, wherein said gas compressor comprises a reciprocating air compressor.

5. The light source lamp cooling apparatus according to claim 4, wherein said reciprocating air compressor comprises a diaphragm air compressor.

6. The light source lamp cooling apparatus according to claim 1, wherein a control frequency of said gas compressor comprises a frequency in a high frequency band.

7. The light source lamp cooling apparatus according to claim 6, wherein said control frequency of said gas compressor comprises a frequency in a frequency band of 20 kHz±5 kHz.

8. The light source lamp cooling apparatus according to claim 1, wherein said gas piping is hollow and flexible.

9. The light source lamp cooling apparatus according to claim 1, wherein said ejector is installed on a reflector holding member which holds a translucent member installed in an emission-side opening of a lamp unit equipped with said light source lamp and couples said translucent member with a reflector, and ejection holes of said ejector are directed to one or more predetermined sites on said light source lamp.

10. The light source lamp cooling apparatus according to claim 9, wherein said shape, area, and number of said ejection holes are set according to a cooling condition of said predetermined sites.

11. The light source lamp cooling apparatus according to claim 9, wherein a total cross-sectional opening area of said ejection holes of said ejector is smaller than a cross-sectional area of said gas piping and is smaller than a cross-sectional area of a cooling wind supply port in said reflector holding member.

12. The light source lamp cooling apparatus according to claim 9, wherein an opening is provided in said reflector holding member to discharge a cooling wind from said lamp unit.

13. The light source lamp cooling apparatus according to claim 1, wherein said gas comprises air.

14. A projection display apparatus comprising said light source lamp cooling apparatus according to claim 1.

15. The light source lamp cooling apparatus according to claim 2, wherein said lamp controller turns off said light source lamp when said gas pressure detected by said pressure detector reaches or falls below a predetermined pressure.

16. The light source lamp cooling apparatus according to claim 2, wherein a control frequency of said gas compressor comprises a frequency in a high frequency band.

17. The light source lamp cooling apparatus according to claim 3, wherein a control frequency of said gas compressor comprises a frequency in a high frequency band.

18. The light source lamp cooling apparatus according to claim 4, wherein a control frequency of said gas compressor comprises a frequency in a high frequency band.

19. The light source lamp cooling apparatus according to claim 5, wherein a control frequency of said gas compressor comprises a frequency in a high frequency band.

20. The light source lamp cooling apparatus according to claim 1, wherein said pressure detector comprises a pressure sensor located between said gas compressor and said ejector, said pressure sensor being placed in said gas piping.

* * * * *